United States Patent [19]

Briggs et al.

[11] 4,230,526
[45] Oct. 28, 1980

[54] LIQUID SODIUM DIP SEAL MAINTENANCE SYSTEM

[75] Inventors: Richard L. Briggs; Sterling A. Meacham, both of Hempfield Township, Westmoreland County, Pa.

[73] Assignee: The United States of America as represented by the United States Department of Energy, Washington, D.C.

[21] Appl. No.: 719,320

[22] Filed: Aug. 31, 1976

[51] Int. Cl.² ............................................. G21C 9/00
[52] U.S. Cl. ....................................... 176/38; 176/40; 176/87
[58] Field of Search ........................ 176/37, 38, 40, 87

[56] References Cited

U.S. PATENT DOCUMENTS

| 3,819,478 | 6/1974 | Thorel et al. | 176/87 |
| 3,819,479 | 6/1974 | Jacquelin | 176/87 |

Primary Examiner—Verlin R. Pendegrass
Assistant Examiner—Ralph Palo
Attorney, Agent, or Firm—Richard G. Besha; C. L. McHale

[57] ABSTRACT

A system for spraying liquid sodium onto impurities associated with liquid dip seals of nuclear reactors. The liquid sodium mixing with the impurities dissolves the impurities in the liquid sodium. The liquid sodium having dissolved and diluted the impurities carries the impurities away from the site thereby cleaning the liquid dip seal and surrounding area. The system also allows wetting of the metallic surfaces of the dip seal thereby reducing migration of radioactive particles across the wetted boundary.

10 Claims, 4 Drawing Figures

LIQUID SODIUM DIP SEAL MAINTENANCE SYSTEM

CROSS-REFERENCE TO RELATED APPLICATIONS

The invention herein disclosed is related to copending application Ser. No. 719,310, filed Aug. 31, 1976, entitled "Ultrasonic Dip Seal Maintenance System", by A. M. Poindexter which is assigned to the present assignee.

BACKGROUND OF THE INVENTION

The invention relates to nuclear reactor dip seal maintenance systems and more particularly to liquid sodium dip seal maintenance systems of nuclear reactor components having rotatable members.

In nuclear reactor designs, well known in the art, a reactor vessel with fuel assemblies disposed therein and having an inlet and outlet for circulation of a coolant in heat transfer relationship with the fuel assemblies is sealed by a closure head located on top of the reactor vessel. In certain designs, the closure head comprises one or more rotatable plugs. These plugs, which may be of varying sizes disposed eccentrically within each other, serve at least two purposes. One purpose is, of course, to seal the reactor internals inside the reactor vessel. Another purpose is to support refueling machines. The rotation of the rotatable plugs positions the refueling machines in appropriate relationship to the fuel assemblies in the reactor vessel to facilitate the refueling process. Since the rotatable plugs must be able to rotate relative to each other, the plugs are mounted so as to define an annulus between them. This annulus, while allowing the rotation of the plugs, also provides a path for the release of radioactive particles located in the reactor vessel. Accordingly, seals are provided at various locations across the annulus to prevent this release of radioactive particles. These seals may be of various types located at one or more locations along the annulus. As is well known in the art, a typical annulus seal may be a liquid dip seal. Furthermore, in a liquid metal fast breeder reactor, the liquid used in the dip seal may be sodium. The dip seal prevents the migration of radioactive particles, which may be present in a cover gas that fills the void between the top of the reactor coolant and the bottom of the closure head, from the cover gas space into the annulus above the dip seal. In certain applications, the liquid sodium dip seal may be placed at such a location or with heating elements surrounding it so that the sodium remains in a liquid state during reactor operation. In other applications, the sodium in the dip seal is allowed to solidify during reactor operation, thereby, increasing the effectiveness of the seal. However, in any application, the sodium must be a liquid during reactor refueling to enable the plugs to rotate.

After a period of exposure, the cover gas which may be an inert gas such as argon becomes contaminated with not only radioactive particles but also oxides and hydrides of sodium. Because the cover gas is in contact with the sodium dip seal, the sodium therein also becomes contaminated with these compounds. These impurities cause a crust to form on the sodium dip seal free liquid surface. In addition, the amount of sodium within the dip seal is reduced due to the formation of these impurities. These impurities may continue to develop to the extent of resisting rotation of the plugs or even to the extent of preventing this rotation. Therefore, it is necessary to periodically remove the impurities from the dip seals. Several methods and mechanisms are known for so removing these kinds of impurities from components but they have not been effective when used in reactor operation.

One method for removing impurities from sodium which is well known in the art involves the application of steam to the deposits. The steam causes a chemical reaction which causes the impurities to recombine and be forced out of the dip seal. There is, however, a major problem with this method. This problem is that liquid sodium reacts violently in contact with steam or oxygen. To reduce this reaction, the steam is mixed with an inert gas such as argon in such a percentage as to limit this violent reaction. Nevertheless, the use of steam creates the same kind of problems that it seeks to eliminate because the steam itself adds impurities that may combine with sodium elsewhere in the reactor system such as the reactor coolant area or other annuli thereby creating a similar problem at a different location. Therefore, while the steam method may temporarily clean the dip seals, the problem may recur at another location.

The most common method for removal of the crust associated with these impurities is by a contact tool such as a scraper. In this method, a scraper is placed in contact with the crust while the plugs are rotated thereby scraping the crust loose and preventing its accumulation to the extent of preventing rotation of the plugs. However, in this method, the scraping action may accumulate the crusty impurities between the scraper and plug annuli surfaces as to clog the annuli and prevent further rotation of the plugs. Of course, this difficulty prevents this method from being a satisfactory method of removing these impurities.

In U.S. Pat. No. 3,819,478, to Thorel et al, issued June 25, 1974, there is described an apparatus that attempts to provide a pair of properly located redundant dip seals in a top shield plug annulus that prevents liquid sodium vapors or cover gas from entering the annulus below the top frozen dip seal in a rotating plug. The Thorel patent also attempts to describe a means of removing impurities from sodium before the sodium is introduced into the dip seals. While the Thorel patent may describe one method of removing impurities from sodium outside of a dip seal it does not teach a method of removing impurities that may contaminate the sodium in a dip seal that is not easily accessible.

While the prior art contains several methods for cleaning sodium deposits on reactor components and for removing impurities from sodium, it does not teach an effective method or non-contacting tool for removing impurities from relatively inaccessible reactor components, such as liquid sodium dip seals.

SUMMARY OF THE INVENTION

A system for removing impurities from dip seals of components of nuclear reactors. The system consists of a fluid supply mechanism and an apparatus for spraying the fluid. The apparatus which is capable of being mounted on components of nuclear reactors while extending to dip seals at relatively inaccessible locations is equipped with a conducting mechanism for conducting a fluid from the fluid supply mechanism to the location of the impurities to be removed. Associated with the conducting mechanisms are heating mechanisms for maintaining the fluid in a fluid state and temperature detection mechanisms for monitoring the temperature of the fluid. The system provides a means for conducting a fluid from a fluid supply to a spraying device for being sprayed onto impurities associated with the dip seals dissolving the impurities and carrying them away from that location thereby cleaning the dip seal and surrounding area.

It is an object of this invention to provide a system for removing impurities from components of nuclear reactors.

It is a particular object of this invention to provide a system for applying a fluid to impurities on components of nuclear reactors thereby dissolving and removing these impurities.

It is a more particular object of this invention to provide a system for spraying a fluid on dip seals and surrounding areas thereby dissolving and removing the impurities associated with the dip seals.

BRIEF DESCRIPTION OF THE DRAWINGS

While the specification concludes with claims specifically pointing out and distinctly claiming the subject matter of the invention, it is believed the invention will be better understood from the following description taken in conjunction with the accompanying drawings, wherein:

DESCRIPTION OF THE PREFERRED EMBODIMENT

In designs of nuclear reactors, the reactor vessel is closed at its top end by a closure head. In some designs, this closure head comprises several rotatable plugs which may be of varying sizes disposed eccentrically with respect to each other that support refueling apparatus. The rotation of these plugs position the refueling apparatus in appropriate relationship with the core in order to refuel the reactor. The plugs may be supported so as to define an annulus between them thereby enabling their relative rotation. In order to prevent a contaminated cover gas which fills the space between the top of the reactor coolant level and the bottom of the plugs from escaping from the reactor vessel, a liquid sodium dip seal is placed in the annuli. Occasionally, these dip seals must be cleaned. The invention, herein described, provides a means for cleaning these seals.

Figure 1:
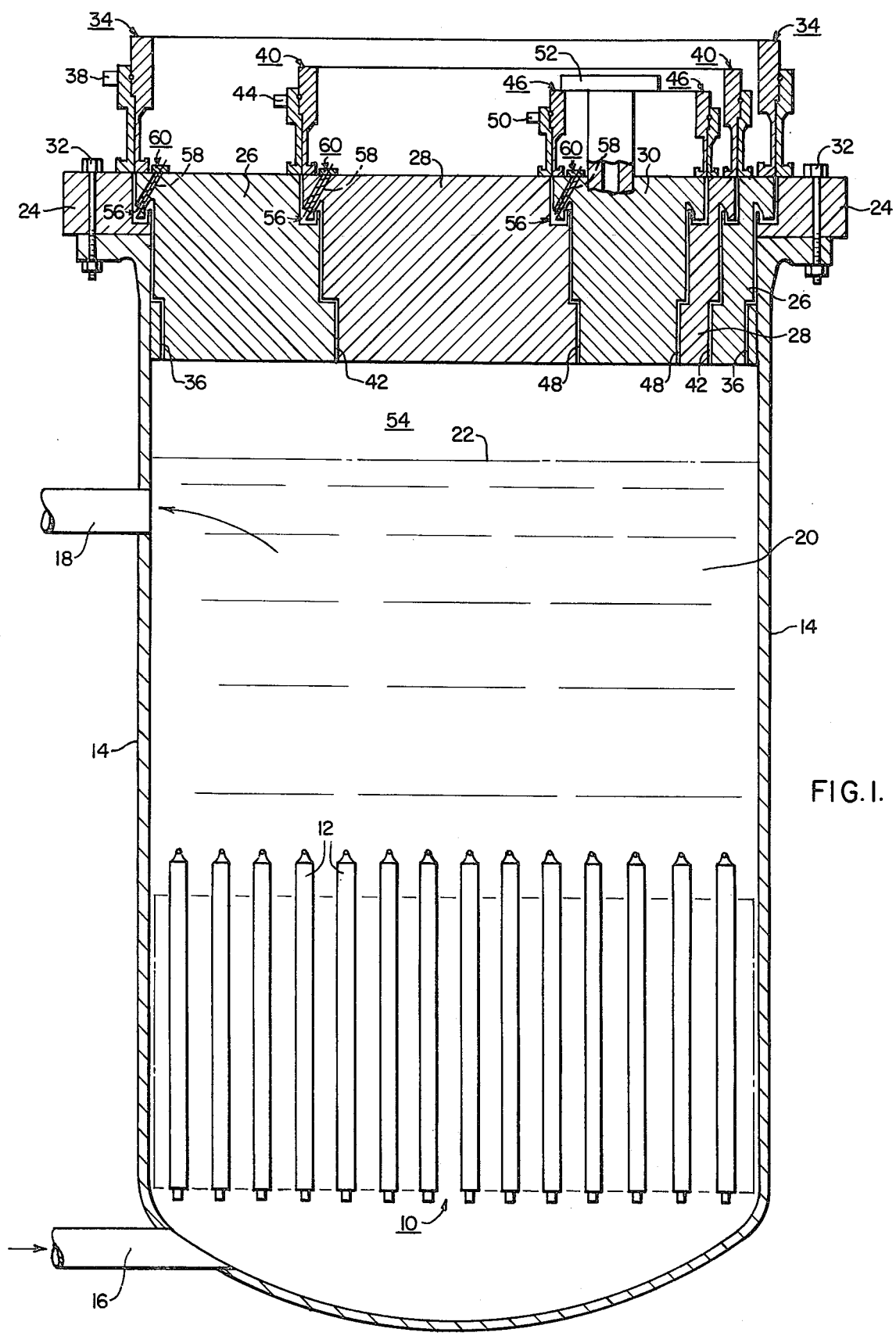
FIG. 1 is a cross-sectional elevation of a nuclear reactor having rotatable closure head plugs and embodying the invention.

Referring to FIG. 1, a core 10 comprising fuel assemblies 12 that produce heat is contained within a reactor vessel 14. The reactor vessel 14 has an inlet 16, and an outlet 18 that permits a coolant 20 to circulate in a heat transfer relationship with the fuel assemblies 12. the coolant 20, which in a fast breeder reactor may be liquid sodium, fills the reactor vessel 14 to a coolant level 22. The reactor vessel 14 is closed at its top end by a closure head comprising a stationary outer ring 24, a large rotatable plug 26, an intermediate rotatable plug 28, and a small rotatable plug 30. The stationary outer ring 24 may be attached to the reactor vessel by bolts 32 or other suitable means known in the art. The large rotatable plug 26 is supported from the stationary outer ring 24 by large riser assembly 34. The outer edge of large rotatable plug 26 together with the inner edge of stationary outer ring 24 define an annulus 36 therebetween. The large riser assembly 24 which contains bearings and seals (not shown) is driven by a plug drive mechanism 38 that enables the large rotatable plug 26 to move relative to stationary outer ring 24 while maintaining a fluid tight boundary between the outside and inside of reactor vessel 14. In addition, the large riser assembly 34 locates the bearings, seals, and drive mechanism away from the hot surface of the large rotatable plug 26 thus providing a cooler operating environment and thus allowing a greater range of selectivity of bearing, seal, and drive mechanism materials.

Again referring to FIG. 1, intermediate rotatable plug 28 is disposed eccentrically within large rotatable plug 26, supported by intermediate riser assembly 40 defining an annulus 42 therebetween, and is driven by plug drive mechanism 44 in a manner similar to that of the large riser assembly 34. Likewise, the small rotatable plug 30 is similarly eccentrically disposed within intermediate rotatable plug 28, supported by small riser assembly 46 defining an annulus 48 therebetween, and driven by plug drive mechanism 50. In addition, small rotatable plug 30 has disposed therein an in-vessel transfer collar 52 which provides access for an in-vessel transfer machine (not shown).

When the reactor coolant 20 is liquid sodium as in the case of liquid metal fast breeder reactors, it is necessary to avoid contact of the liquid sodium by oxygen because such contact will result in a violent reaction. To thus avoid this reaction, the space between the bottom of the closure head and the coolant level 22 is filled with a cover gas 54 which may be an inert gas such as argon. The cover gas 54 not only fills the cover gas space but it also fills the annuli (36, 42, 48). While the cover gas 54 prevents oxygen from contacting the coolant 20, the cover gas 54, itself, becomes contaminated with radioactive gaseous fission products and is also subjected to radiation exposure from the core and thus becomes contaminated with radioactive particles. It, therefore, becomes necessary to prevent the contaminated cover gas 54 from escaping up the annuli (36, 42, 48), through the seals in the upper risers, and out of the reactor. To insure against this release, at least one liquid dip seal which may hold liquid sodium is placed in each of the annuli in a manner well known to those skilled in the art. A typical dip seal 56 along with a typical dip seal maintenance port 58 is shown on the large rotatable plug 26.

Figure 2:
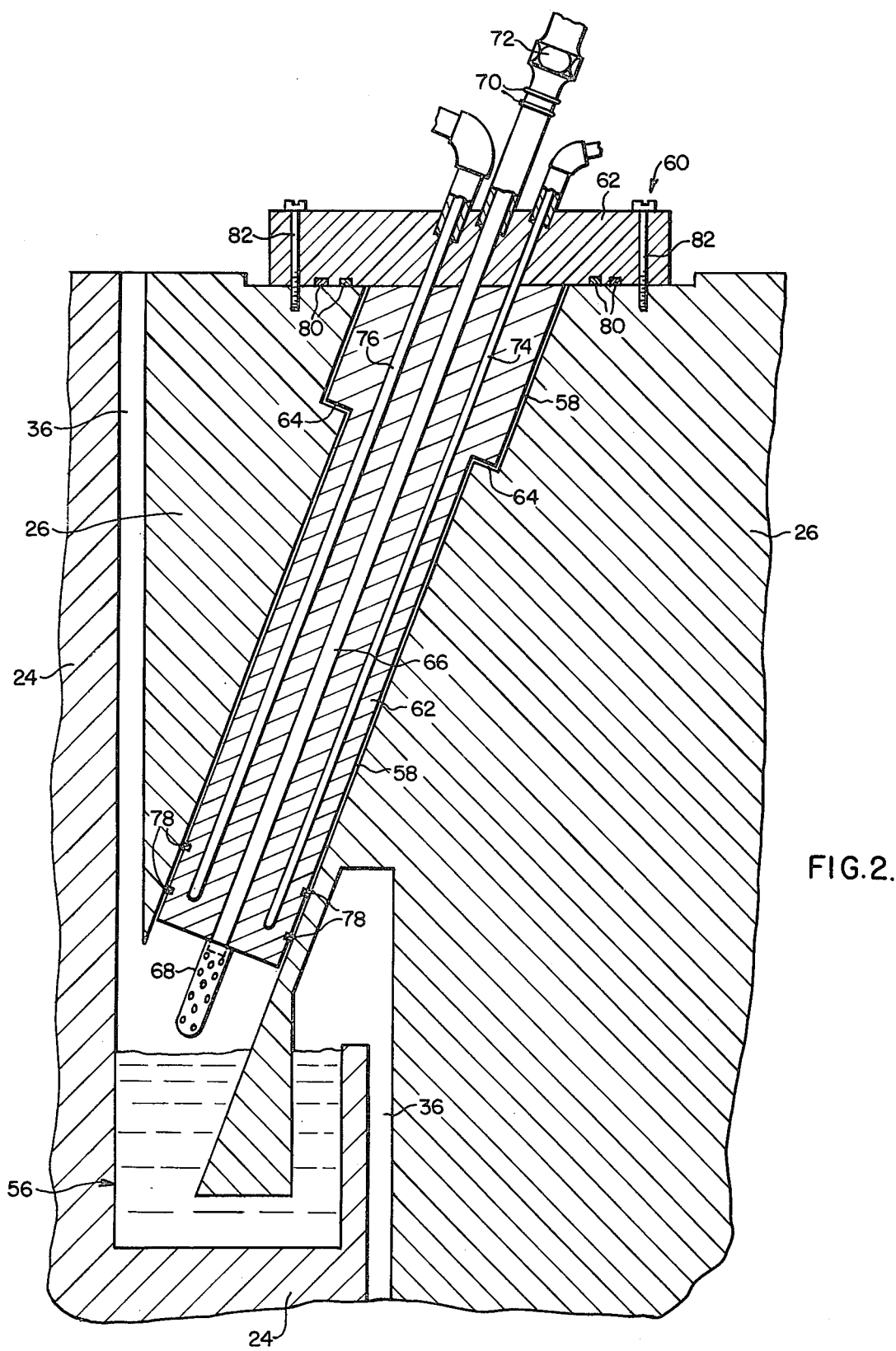
FIG. 2 is a cross-sectional elevation of the dip seal maintenance apparatus disposed on a rotatable closure head plug of a nuclear reactor.

Referring to FIG. 2, the dip seal maintenance apparatus referred to generally at 60 is shown disposed in dip seal maintenance port 58. The body 62 of the apparatus extends from a relatively accessible location such as the top of a rotatable plug 26 to a relatively inaccessible location such as dip seal 56. The body 62 has a neutron streaming step 64 which eliminates any possible straight line paths from the dip seal area to the outside of the reactor vessel thereby preventing the streaming of neutrons from the core. A conduit 66 having disposed thereon at one end a nozzle 68 and at its other end a bagging groove 70 and sodium line connection 72, is disposed within body 62. Conduit 66 conducts sodium from a sodium supply to nozzle 68 from where the sodium is emitted in a spraying fashion. Thermocouples 74 are provided in body 62 to monitor the temperature of the sodium and surroundings. Should the thermocouples 74 indicate that the conduit 66 should be heated, heating elements 76, which are also disposed in body 62, are activated thereby maintaining conduit 66 and body 62 at the appropriate temperatures. In addition, seals which may be chosen from those well known in the art, such as piston ring seals 78 and metal O-ring seals 80, are disposed about body 62 to prevent escape of any radioactive particles or gases that may be present near the dip seal 56. Also, the body 62 may be temporarily attached to a rotatable plug by suitable attachment means such as bolts 82 or the body 62 may be permanently attached by means well known in the art such as welding.

Figure 3:
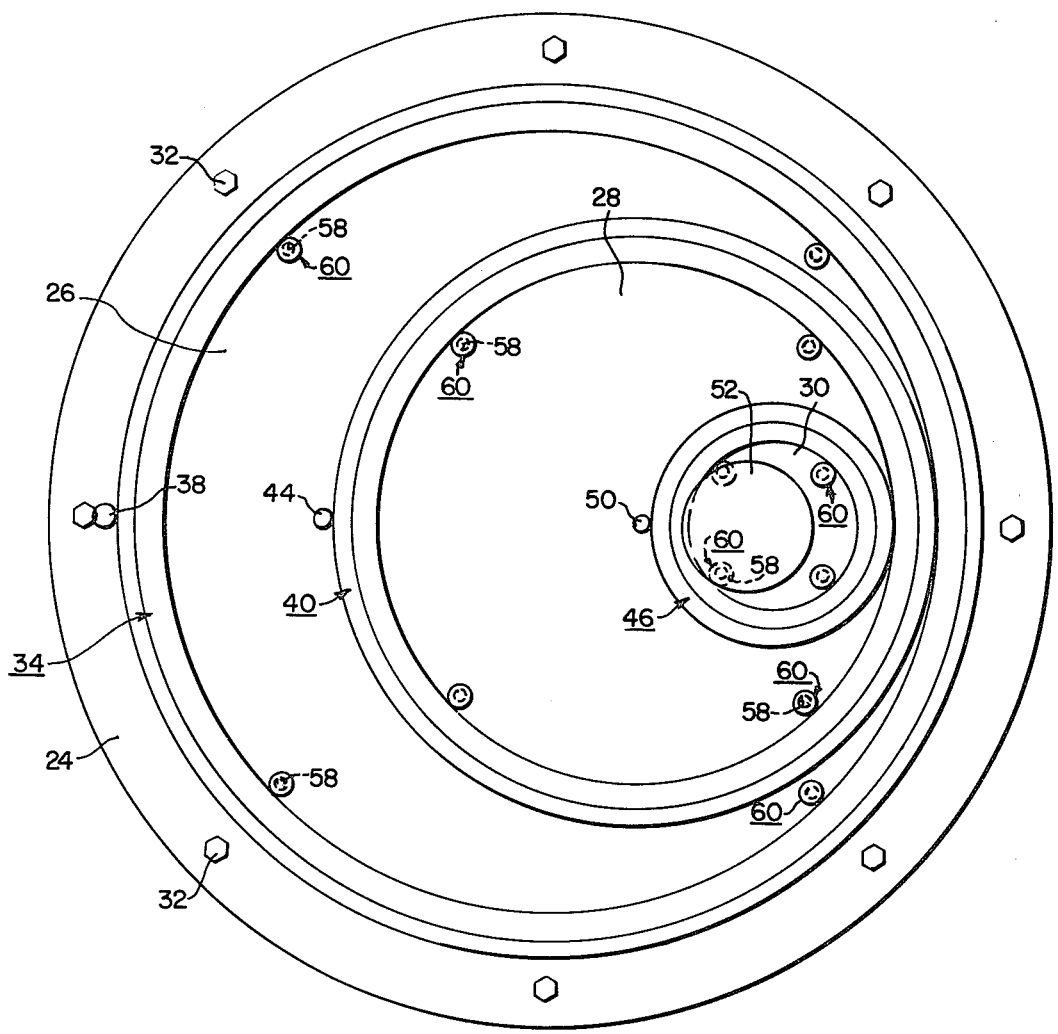
FIG. 3 is a plan view of the dip seal maintenance apparatus and closure head plugs; and, FIG. 4 is a diagram of the sodium supply system for the dip seal maintenance apparatus.

Referring to FIG. 3, a number of dip seal maintenance ports 58 are shown on each rotatable plug. In the case where the dip seal maintenance apparatuses 60 are permanently attached, each dip seal maintenance port 58 on every plug will have an apparatus disposed therein during the cleaning process. However, where the dip seal maintenance apparatuses 60 are only temporarily attached, the dip seal maintenance apparatuses used to clean the dip seals of one plug may also be utilized on the other plugs in sequential fashion.

Figure 4:
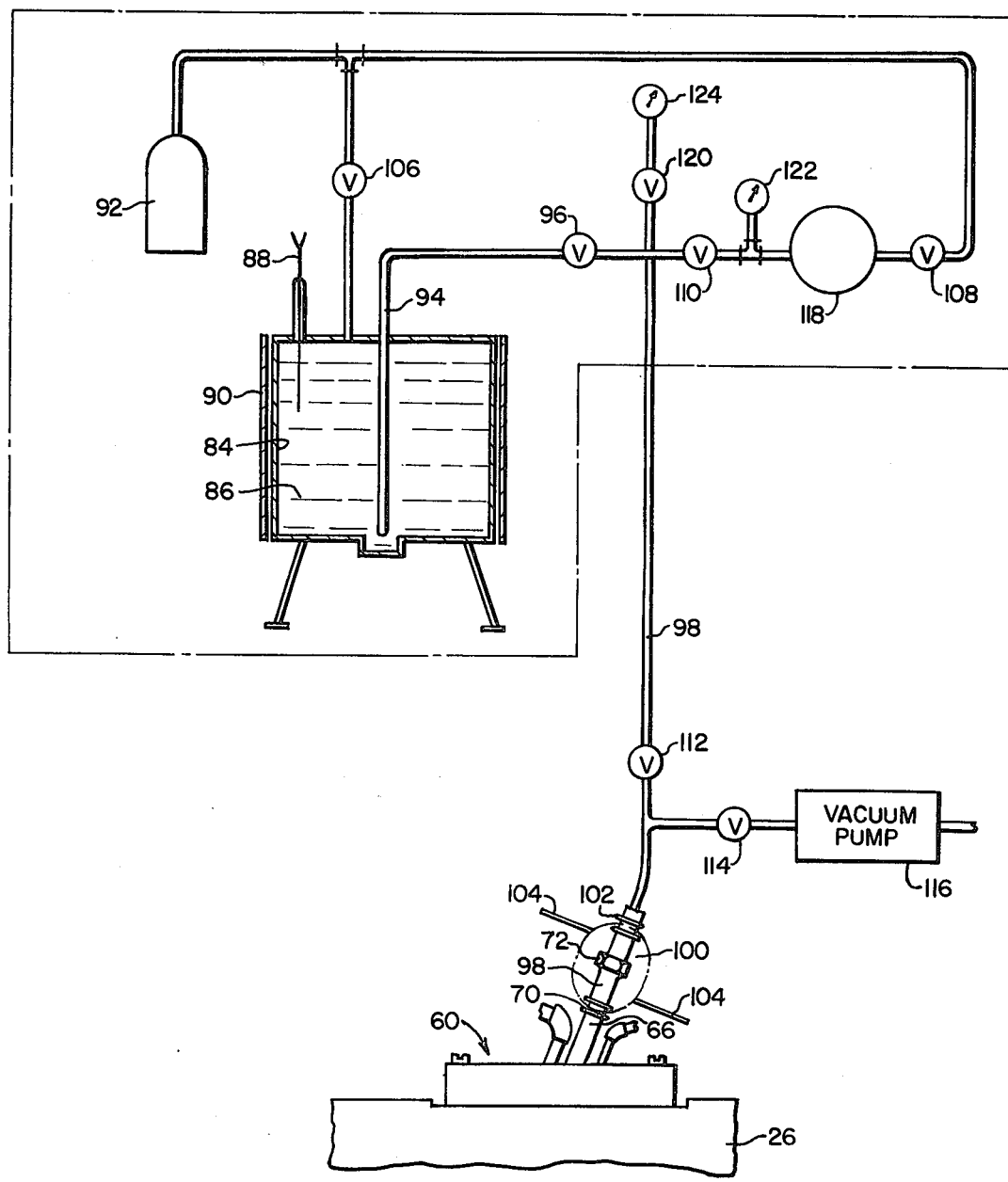

A typical remote means of supplying liquid sodium to the dip seal maintenance apparatus 60 is shown in FIG. 4. A reservoir 84 having liquid sodium 86 therein and surrounded by appropriate insulation is equipped with thermocouples 88 to monitor temperature and heaters 90 to maintain the liquid sodium 86 at a proper temperature. In addition, valves and heated conduits are provided to conduct the liquid sodium 86.

Before the actual dip seal cleaning procedure may be begun, the sodium supply should be prepared by utilization, the sodium supply system should be attached to the dip seal maintenance apparatus 60, and the conduits should be checked to make sure that they are not blocked. In preparing the sodium supply for utilization, reservoir 84 is charged with molten sodium and allowed to solidify. Reservoir 84 may then be moved near the dip seal maintenance apparatus 60 where an inert gas supply 92 such as argon is connected by conduit to reservoir 84. Siphon tube 94 is then connected to valve 96. At this point the sodium is heated to a liquid state by means of heaters 90. For an initial filling of the dip seals the temperature of liquid sodium 86 may be approximately 600° F.; however the temperature of liquid sodium 86 for cleaning purposes should be between about 600° F. to about 1200° F. depending on the allowable thermal shock capacity of the material comprising the dip seal. Next, the heating elements 76 are activated to maintain the conduit 66 at an appropriate temperature.

Because air does not react favorably with liquid sodium, the conduits of the sodium supply system should be flushed with an inert gas such as argon to remove traces of air that might be present in the conduits. In addition, the openings of the sodium supply system and of the dip seal maintenance apparatus 60 should be isolated from the atmosphere to prevent air from leaking in while the sodium supply system is attached to the dip seal maintenance apparatus 60. In this regard, supply line 98, a flexible conduit, is brought in close proximity to sodium line connection 72 while bagging chamber 100 which is a flexible isolation chamber, is connected to bagging groove 70 and bagging groove 102. Then an inert gas such as argon is circulated by means of argon supply line 104 through the bagging chamber 100 isolating supply line 98 and sodium line connection 72 from the atmosphere outside bagging chamber 100 thereby insuring that any leakage around bagging chamber 100 will be out the atmosphere. With valves 106 and 96 closed and with valves 108, 110, 112, and 114 open, supply line 98 is flushed with argon gas to a vacuum pump 116. Once the supply line 98 is flushed, valves 108 and valves 114 are closed thereby ending the flushing process. Supply line 98 is then connected to sodium line 72. The bagging chamber 100 may then be removed because once supply line 98 is connected to sodium line 72 there is little danger of air entering the system through this joint.

At this point in the cleaning process a test may be performed to ascertain that the nozzle 68 is not obstructed. To perform this test valve 110 is closed and valve 108 is opened while expansion tank 118 is pressurized. When expansion tank 118 is sufficiently pressurized, valves 96, 108, 112, 114 and 120 are closed and valve 110 is opened while the pressure is recorded on gauge 122. Valve 112 is then opened. If the nozzle 68 is clear the pressure as read on gauge 122 will decrease to a predetermined pressure. However, if nozzle 68 is obstructed gauge 122 will register another predetermined pressure. Of course, these predetermined pressures will depend on the particular dip seal construction and therefore must be predetermined by experiments and calculations relating to the specific design. In the event that nozzle 68 is clear the cleaning process may continue; if, however, nozzle 68 is obstructed the following procedure may be followed.

A nozzle clearing procedure should include maintaining conduit 66 at about 400° F. while liquid sodium 86 is about 1000° F. With valves 96, 108, and 110 closed, open valves 114 and 120 while evacuating supply line 98 by means of vacuum pump 116. Gauge 124 should then record the pressure in supply line 98. Valves 114 and 120 should then be closed while valve 106 is opened pressurizing reservoir 84 with argon through valve 106. Next valve 106 should be closed and valve 96 opened forcing liquid sodium through siphon tube 94 into supply line 98 and into conduit 66 thereby dissolving the material plugging nozzle 66. At this point the process may proceed as if there had not been an obstruction in nozzle 66.

OPERATION

In order to prevent a severe thermal shock to the metal adjacent the dip seal to be cleaned, the pertinent rotatable plug should begin to be rotated before the liquid sodium 86 is sprayed from nozzle 68. Once the plug has begun rotating the argon pressure on reservoir 84 will force the liquid sodium 86 through conduit 66 and out nozzle 68. Nozzle 68 sprays the liquid sodium 86 on the dip seal surface and surrounding area such as the plug walls that define the annulus. The spray of liquid sodium stirs the sodium in the dip seal and raises its temperature thereby increasing the solubility of the impurities in the sodium in the dip seal. Increasing the solubility causes the impurities that have settled out to become redissolved in the dip seal sodium thereby eliminating the crust on the dip seal surface. Also, at a high enough temperature such as 600° F., wetting of the dip seal surface will occur causing surface oxides on the metal surrounding the dip seal to also become dissolved in the dip seal sodium. This wetting creates a close contact between the sodium in the dip seal and the metal surfaces of the dip seal thus reducing the area of a possible leak path from the cover gas 54 to that part of the annulus 36 above the dip seal thereby increasing the effectiveness of the dip seal. As this process continues an excess of sodium is added to the dip seal causing an amount of sodium to flow over the dip seal, down an annulus such as annulus 36, and into the reactor coolant 20. This overflow of the excess sodium dilutes the impurities in the dip seal and carries the impurities away into the reactor coolant 20.

After a sufficient amount of liquid sodium 86 has been added as may be measured by an electromagnetic flow meter disposed on supply line 98, the supply line 98 may be disconnected from sodium line connection 72 by substantially reversing the connecting process. Once disconnected the supply line 98 may be connected to another dip seal maintenance apparatus 60 on another plug and the process repeated. The invention, therefore, provides a means for spraying a fluid on dip seals and surrounding areas thereby dissolving and removing the impurities associated with the dip seals.

While there is described what is now considered to be the preferred embodiment of the invention, it is, of course understood that various other modifications and variations will occur to those skilled in the art. The claims, therefore, are intended to include all such modifications and variations which fall within the true spirit and scope of the present invention. For example, rather than using a multidirectional spray nozzle, a unidirectional nozzle may be used. In addition a different sodium supply means may be used in conjunction with the dip seal maintenance apparatus.

We claim as our invention:

1. A system for removing impurities from dip seals including a vessel designed to contain radioactive material and a closure head disposed on said vessel having at least one rotatable plug for positioning refueling equipment, said rotatable plug and vessel defining an annulus to enable the rotation of said rotatable plug, said annulus having a liquid dip seal disposed thereacross for preventing the release of said radioactive material, and liquid sodium means associated with said dip seal for introducing liquid sodium to said dip seal at a temperature of at least 600° F. and for overflowing said liquid sodium from said dip seal and down said annulus thus removing said impurities therefrom.

2. The system recited in claim 1 wherein said liquid sodium means comprises:
a member disposed in said rotatable plug extending from the outside thereof to the dip seal area; and
a conductor disposed in said member for conducting liquid sodium to said dip seal area for mixing with said impurities and causing said impurities to be dissolved in said liquid sodium.

3. The system recited in claim 2 wherein said liquid sodium means further comprises:
heating means associated with said member for heating said conductor.

4. The system recited in claim 3 wherein said liquid sodium means further comprises:
temperature detection means in said member for determining the temperature of said liquid sodium.

5. The system recited in claim 4 wherein said liquid sodium means further comprises:
liquid sodium supply means connected to said conductor for supplying liquid sodium to said dip seal area, said liquid sodium mixing with said impurities and causing said impurities to be dissolved in said liquid sodium.

6. The system recited in claim 5 wherein said member further comprises:
a substantially cylindrical body with a first portion of said body having a diameter different from a second portion of said body thereby forming a step for preventing the streaming of neutrons.

7. The system recited in claim 6 wherein said conductor further comprises:
a nozzle disposed on said conductor near said dip seal area for directing the flow of said liquid sodium from said conductor.

8. The system recited in claim 7 wherein said liquid sodium means further comprises:
isolation means associated with said conductor and said liquid sodium supply means for isolating the interconnection of said conductor and said supply means from a hostile environment.

9. The system recited in claim 8 wherein said isolation means comprises:
a containment chamber having an inlet and an outlet enclosing said interconnection; and
an isolating fluid circulating through said containment chamber by means of said inlet and said outlet for creating a pressure differential across the boundary of said containment chamber thereby causing any leakage associated with said containment chamber to be out of said containment chamber.

10. The system recited in claim 1 wherein said liquid sodium means further comprises:
sealing means disposed on said member for isolating said dip seal area from said environment.

* * * * *